(12) United States Patent
Shi et al.

(10) Patent No.: US 10,331,699 B2
(45) Date of Patent: Jun. 25, 2019

(54) DATA BACKUP METHOD AND APPARATUS

(71) Applicant: Alibaba Group Holding Limited, Grand Cayman (KY)

(72) Inventors: Yunliang Shi, Hangzhou (CN); Huabing Du, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 732 days.

(21) Appl. No.: 14/994,596

(22) Filed: Jan. 13, 2016

(65) Prior Publication Data
US 2016/0203201 A1   Jul. 14, 2016

(30) Foreign Application Priority Data
Jan. 14, 2015   (CN) .......................... 2015 1 0019142

(51) Int. Cl.
G06F 16/30 (2019.01)
G06F 16/27 (2019.01)
G06F 16/23 (2019.01)

(52) U.S. Cl.
CPC ........ G06F 16/273 (2019.01); G06F 16/2358 (2019.01)

(58) Field of Classification Search
CPC ......... G06F 17/30578; G06F 17/30368; G06F 16/273; G06F 16/2358; G06F 11/1469; Y10S 707/99953
See application file for complete search history.

(56) References Cited

U.S. PATENT DOCUMENTS

| 5,255,388 A | 10/1993 | McLaughlin et al. |
| 6,445,905 B1 | 9/2002 | Pentikainen |
| 6,532,551 B1 | 3/2003 | Kamei et al. |
| 7,028,155 B2 * | 4/2006 | Haas ................... G06F 11/1666 711/115 |

(Continued)

FOREIGN PATENT DOCUMENTS

| CN | 101706795 A | 5/2010 |
| CN | 103780638 A | 5/2014 |
| CN | 104216802 A | 12/2014 |

OTHER PUBLICATIONS

Sangjun Jeon, Jewan Bang, Keunduck Byun, and Sangjin Lee, "A Recovery Method of Deleted Recored for SQLite Database", Published online: Jul. 24, 2011, Springer-Verlag London Limited, pp. 707-715. (Year: 2011).*

(Continued)

*Primary Examiner* — Cheryl Lewis
(74) *Attorney, Agent, or Firm* — Lee & Hayes, P.C.

(57) ABSTRACT

A method and an apparatus for data backup are disclosed. The method includes querying a slave for check information, where the check information is data inserted into a master when data written to the master is copied into the slave in a form of a log; obtaining a time at which the check information is inserted into the master and setting the time as a backup completion time point; and deleting data record(s) that is/are earlier than the backup completion time point from mirrored data, the mirrored data being data that is synchronously written to a defined storage space when the data is written to the master. The method for data backup is easy to implement at a low cost, and provides highly secure data backup.

20 Claims, 4 Drawing Sheets

(56) References Cited

U.S. PATENT DOCUMENTS

| | | |
|---|---|---|
| 7,624,155 B1 | 11/2009 | Nordin et al. |
| 7,941,404 B2 | 5/2011 | Garimella et al. |
| 2007/0016632 A1 | 1/2007 | Schulz et al. |
| 2007/0083722 A1 | 4/2007 | Per et al. |
| 2008/0208923 A1 | 8/2008 | Watanabe et al. |
| 2010/0250491 A1* | 9/2010 | Jin .................... G06F 17/30575 707/634 |
| 2014/0281257 A1 | 9/2014 | Hochberg et al. |
| 2015/0317351 A1 | 11/2015 | Cheng et al. |

OTHER PUBLICATIONS

PCT Search Report and Written Opinion dated Mar. 29, 2016 for PCT Application No. PCT/US16/13188, 8 pages.
Chinese first Office Action and Search Report dated Apr. 26, 2018 for Chinese patent application No. 201510019142.7, 8 pages.

\* cited by examiner

DATA BACKUP METHOD AND APPARATUS

CROSS REFERENCE TO RELATED PATENT APPLICATION

This application claims foreign priority to Chinese Patent Application No. 201510019142.7 filed on Jan. 14, 2015, entitled "Data Backup Method and Apparatus", which is hereby incorporated by reference in its entirety.

TECHNICAL FIELD

The present disclosure relates to the technological field of data backup, and more particularly, to data backup methods. The present disclosure further relates to methods of detecting a data difference between a master and a slave, apparatuses for data backup, and apparatuses for detecting a data difference between a master and a slave.

BACKGROUND

With the rapid development of transaction systems in recent years, existing database management systems (DBMS) have been improved significantly. In addition, the number of users and services have increased as well as the number and complexity of transactions in transaction systems, which lead to frequent changes in DBMS data. The ACID (Atomicity, Consistency, Isolation and Durability) of the DBMS implements and ensures the stability and durability of the DBMS data. Durability represents that persistent data consistency is guaranteed in an event of a Host failure. At present, the DBMS employs an open MySQL database product, which is implemented through asynchronous data replications between a master and a slave. The master first records a change in data in a binary log (called binlog), which records an event when data is written into the master or when a data change occurs in the master. The slave executes events recorded in a relay log, and updates data stored therein using events recorded in the binlog. During a process of an asynchronous data replication between a master and a slave, the slave may fail to timely replicate data in the master if an abnormal situation suddenly occurs in the master, which results in a data loss.

In order to resolve data losses caused by an asynchronous data replication between a master and a slave in the MySQL database, an existing solution primarily includes a semi-synchronous replication mode for the MySQL database. Under the semi-synchronous replication mode, a master and at least one slave are set up. After the master completes an execution of a certain transaction thereof, a delay is set to wait for the slave to execute that transaction. The master will continue to wait until any one of the slaves has executed the transaction, thus avoiding data losses, which are caused by an occurrence of abnormality in the master that makes the slave fail to replicate data in the master timely.

Deficiencies apparently exist in existing technologies as described above. The semi-synchronous replication mode for the MySQL database is difficult to implement, and an extra delay that is added to the execution of a single transaction increases the time for data backup. In addition, if an abnormality occurs in a slave in the semi-synchronous replication mode for the MySQL database, a master cannot receive any transaction messages sent by the slave. The master will switch to an asynchronous replication mode after the delay is ended, and will remain in the asynchronous replication mode, thus having certain deficiencies.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present disclosure provides a method of data backup to solve the problems of time-consuming and difficult implementations of data backup in existing technologies. The present disclosure also relates to a method for detecting a data difference between a master and a slave, an apparatus of data backup, and an apparatus for detecting a data difference between a master and a slave.

According to an aspect of the present disclosure, a method of data backup is provided, which may include querying a slave for check information, where the check information is information inserted into a master, and the check information is copied into the slave at a time when data written in the master is copied into the slave in a form of a log; obtaining a time at which the check information is inserted into the master, and using the obtained time as a time point of backup complete; and deleting data record(s) that is/are earlier than the time point of backup complete from mirrored data, where the mirrored data is data that is synchronously written to a defined storage space when the data is written to the master.

In implementations, the method may further include inserting the check information into the master, which may include:

periodically detecting whether any data is written to the master in a preset period of time; and if affirmative, detecting whether the check information exists in the master, and inserting the check information into the master by replacing check information stored in the master if the check information exists in the master, or inserting the check information into the master if the check information does not exist in the master; or if not, returning to the act of periodically monitoring whether any data is written to the master in the preset period of time.

In implementations, copying the data and the check information into the slave in the form of the log may include recording the data written to the master and the check information into a binary log; replicating a data event recorded in the binary log to a relay log; and executing a data event recorded in the relay log and updating the slave using data and check information recorded in the relay log.

In implementations, deleting the data record(s) that is/are earlier than the time point of backup complete from mirrored data may include obtaining a time at which the mirrored data is written into the storage space; comparing the time at which the mirrored data is written into the storage space with the time point of backup complete to obtain the data record(s) in the mirrored data that is/are earlier than the time point of backup complete; and deleting the data record(s) that is/are earlier than the time point of backup complete from the mirrored data.

In implementations, obtaining the time at which the check information is inserted into the master may include reading the time at which the check information is inserted into the master from the check information, and using the time as the time point of backup complete.

In implementations, obtaining the time at which the check information is inserted into the master may include reading the time at which the check information is inserted into the master from the data event based on the data event recorded in the relay log, and using the time as the time point of backup complete.

In implementations, synchronously writing the data into the defined storage space may include one or more of synchronously writing the data into the defined storage space in a form of a local storage, or synchronously writing the data into the defined storage space in a form of a remote storage.

In implementations, the storage space may include internal memory and/or a magnetic disk.

The present disclosure further provides a method for detecting a data difference between a master and a slave, which includes querying a slave for check information, where the check information is information inserted into a master, and the check information is copied into the slave at a time when data written in the master is copied into the slave in a form of a log; obtaining a time at which the check information is inserted into the master, and using the time as a backup completion time point; detecting whether data that is written to the master at a time later than the backup completion time point exists in the master; and treating the data that is written to the master at the time later than the backup completion time point as differential data between the master and the slave if affirmative.

In implementations, detecting whether data that is written to the master at a time later than the backup completion time point exists in the master may include periodically detecting whether data that is written to the master at a time later than the backup completion time point exists in the master; detecting whether the data that is written to the master at the time later than the backup completion time point exists in the slave if affirmative; determining that no differential data exists between the master and the slave in response to detecting that the data that is written to the master at the time later than the backup completion time point exists in the slave; and treating the data that is written to the master at the time later than the backup completion time point as the differential data between the master and the slave in response to detecting that the data that is written to the master at the time later than the backup completion time point does not exist in the slave.

The present disclosure further provides an apparatus for data backup, which may include a check information query unit configured to query a slave for check information, wherein the check information is information inserted into a master, and the check information is backed up into the slave at a time when data written in the master is backed up into the slave in the form of a log; a backup completion time point acquisition unit configured to obtain a time at which the check information is inserted into the master, and using the obtained time as a time point of backup complete; and a data record deletion unit configured to delete data record(s) that is/are earlier than the time point of backup complete from mirrored data, wherein the mirrored data is data which is synchronously written to a defined storage space when the data is written to the master.

In implementations, the following units are used to insert the check information into the master. A data writing detection unit is configured to periodically detect whether any data is written to the master in a preset period of time. In response to detecting that data is written to the master in the preset period of time, a check information detection unit is executed. Otherwise, operations are returned to the data writing detection unit. The check information detection unit is configured to detect whether the check information exists in the master, insert the check information into the master to replace original check information stored in the master if affirmative, or insert the check information into the master if not.

In implementations, the data and the check information are backed up into the slave through the following units. A data write unit is configured to record the data written to the master and the check information into a binary log. A data replication unit is configured to replicate a data event recorded in the binary log to a relay log. A data update unit is configured to execute a data event recorded in the relay log, and update the slave using data and check information recorded in the relay log.

In implementations, the data record deletion unit may include a data writing time acquisition subunit configured to obtain a time at which the mirrored data is written into the storage space; a data comparison subunit configured to compare the time at which the mirrored data is written into the storage space with the time point of backup complete to obtain data record(s) in the mirrored data that is/are earlier than the time point of backup complete; and a data deletion subunit configured to delete the data record(s) that is/are earlier than the time point of backup complete from the mirrored data.

The present disclosure also provides an apparatus for detecting a data difference between a master and a slave, which may include a check information query unit configured to query a slave for check information, wherein the check information is information inserted into a master, and the check information is backed up into the slave at a time when data written in the master is backed up to the slave in a form of a log; a backup completion time point acquisition unit configured to obtain a time at which the check information is inserted into the master, and use the time as a backup completion time point; and a data detection unit configured to detect whether data that is written into the master at a time later than the backup completion time point exists in the master, wherein a differential data generation unit is executed if affirmative, the differential data generation unit being configured to use the data that is written into the master at the time later than the backup completion time point as differential data between the master and the slave.

In implementations, the data detection unit may include a first data detection subunit configured to periodically detect whether data that is written to the master at a time later than the backup completion time point exists in the master, wherein a second data detection subunit is executed if affirmative, the second data detection subunit being configured to detect whether the data that is written to the master at the time later than the backup completion time point exists in the slave, determine that no differential data exists between the master and the slave in response to detecting that the data that is written to the master at the time later than the backup completion time point exists in the slave, and use the data that is written to the master at the time later than the backup completion time point as the differential data between the master and the slave in response to detecting that the data that is written to the master at the time later than the backup completion time point does not exist in the slave.

As compared with existing technologies, the present disclosure has the following advantages:

The disclosed data backup method includes querying a slave for check information, wherein the check information is information inserted into a master, and the check information is backed up into the slave at a time when data written in the master is backed up into the slave in a form of a log; obtaining a time at which the check information is inserted into the master, and using the obtained time as a time point of backup complete; and deleting data record(s) that is/are earlier than the time point of backup complete from mirrored data, wherein the mirrored data is data which is synchronously written to a defined storage space when the data is written to the master.

The disclosed data backup method backs up data to a master and at the same time, backs up the data to a storage space that is independent and separate from a storage of the master via complete mirroring to form mirrored data. The disclosed method further backs up data in the master to a slave in a form of a log to form another data copy, detects duplicate data between the master and the slave by periodically inserting check information into the master and periodically querying the slave for the check information, deletes the duplicate data between the master and the slave from the mirrored data to enable the mirrored data and the data in the slave to form a complete data copy, which is easy to implement at a low cost and provides highly secure data backup.

DETAILED DESCRIPTION

Specific details are described hereinafter to facilitate full understanding of the present disclosure. However, the present disclosure may be implemented in a number of other ways different from what is described herein, and similar elaboration may be made by one skilled in the art without departing from the spirit of the present disclosure. Therefore, the present disclosure is not limited to exemplary implementations described herein.

The present disclosure provides a method for data backup. In addition, the present disclosure also provides a method for detecting a data difference between a master and a slave, an apparatus for data backup, and an apparatus for detecting a data difference between a master and a slave.

In an embodiment, a method for data backup according to the present disclosure is described as follows.

Figure 1:
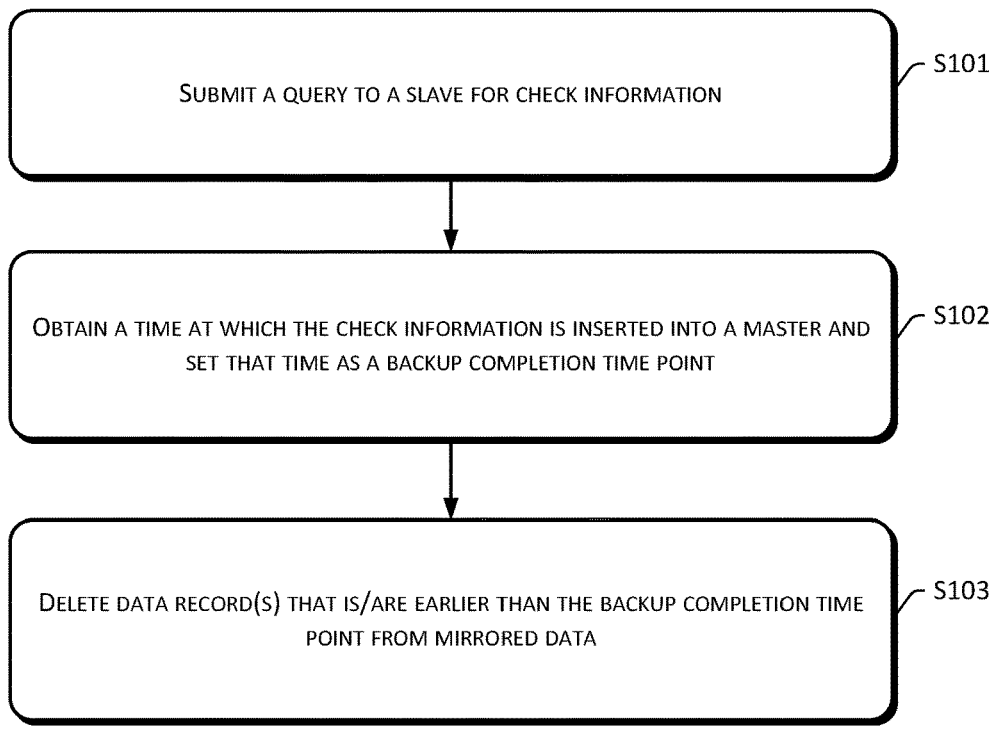
FIG. 1 is a flowchart of a method for data backup according to an embodiment of the present disclosure.

FIG. 1 shows a flowchart of a method for data backup according to an embodiment of the present disclosure.

The disclosed method for data backup and method blocks thereof are described herein with reference to FIG. 1. In addition, a particular order of the method blocks of the disclosed method for data backup is shown in FIG. 1.

S101 submits a query to a slave for check information.

In implementations, the disclosed method for data backup is described through a method for backing up data for a MySQL database as an example. In implementations, a master and a slave are therefore referred to as MySQL databases.

In implementations, the disclosed method for data backup may also be described using other database platforms, which are not limited herein.

The check information refers to information that is inserted into the master and contains particular information to distinguish from the data (i.e., data to be backed up).

It should be noted that, before submitting a query to a slave for check information, the method may include inserting the check information into the master, which may be implemented as follows:

Block (1) periodically detects whether any data is written to the master in a preset period of time.

The data refers to data to be backed up, and includes useful data, e.g., user information, transaction information, etc., that is generated after an application program is invoked by a transaction system.

A purpose of setting a time period in the foregoing detection is to reduce the volume of processing data. For example, the volume of data is relatively less late at night or early in the morning, and a frequency of inserting check information into the master decreases greatly at those times. Setting a time period for detection can avoid a waste of system resources that is caused by frequent insertion of check information into the master in some specific scenarios.

The method proceeds with block (2) to detect whether the check information exists in the master upon detecting that data is written to the master in the preset period of time.

Otherwise, block (1) is repeated, and returns to the act of periodically detecting whether any data is written to the master in the preset period of time.

In addition, periodically detecting whether any data is written to the master in the preset period of time may also be implemented by other methods, for example, by detecting whether any data is written to the master in a particular period of time, which is not limited herein.

Block (2) detects whether the check information exists in the master, and if the check information exists, inserts the check information into the master by replacing check information stored in the master, or inserts the check information into the master otherwise.

The present embodiment inserts the check information into the master by way of overwriting or replacement. Therefore, before the check information is inserted into the master, detection is needed to determine whether the check information exists in the master. If the check information is detected to exist in the master, the data is inserted into the master by replacing the check information stored in the master. If the check information is found not to exist in the master, this indicates that the check information is inserted into the master for the first time or an abnormality has occurred in the master. In this case, the check information may be directly inserted into the master.

In addition, it should be noted that, before submitting a query to a slave for check information, the method may further include backing up data stored in the master and the check information to the slave in a form of a log based on a principle of asynchronous replication between the master and the slave of MySQL databases. An exemplary implementation may include recording the data written to the master and the check information into a binlog; replicating a data event recorded in the binlog to a relay log; and executing a data event recorded in the relay log, and updating the slave using data and check information recorded in the relay log.

The foregoing process of replicating the data stored in the master and the check information to the slave consumes a certain amount of time. As a result, when an abnormality occurs in the master, the data in the master and/or the check information may not be completely replicated to the slave, resulting in the slave's losses in the data and/or the check information.

In order to solve this defect, the disclosed method writes the data simultaneously to a defined storage space to generate mirrored data for the data when the data is written to the master.

In implementations, the disclosed method may perform serialization to the data, and writes the data to a local storage space of a computing device to generate mirrored data for the data after serializing the data into a data format that is storable. In implementations, the storage space may include internal memory, a magnetic disk, or a combination of internal memory and a magnetic disk.

In addition, the data may also be stored in a storage space of a remote server, or stored in a cloud storage space, which is not limited herein.

S102 obtains a time at which the check information is inserted into the master, and sets that time as a backup completion time point.

This method block is executed on a condition that the check information is found in the slave at S101.

Based on the check information found in the slave at S101, an exemplary implementation of obtaining the time at which the check information is inserted into the master and setting the time as the backup completion time point may include finding a relay log that includes the check information in a data table of the slave; reading, according to a data event recorded in the relay log, the time at which the check information is inserted into the master from the data event; and setting the time at which the check information is inserted into the master as the backup completion time point.

In addition, obtaining the time at which the check information is inserted into the master may also be implemented by other methods, for example, by reading the time at which the check information is inserted into the master from time information included in the check information and using the time as the backup completion time, which is not limited herein.

S103 deletes data record(s) that is/are earlier than the backup completion time point from mirrored data.

S101 submits a query to a slave for check information. S102 obtains a backup completion time point. The current method block deletes data that is redundantly stored in the mirrored data and the slave, i.e., deletes data record(s) that is/are earlier than the backup completion time point from the mirrored data. An exemplary implementation may include the following:

1) obtaining a time at which the mirrored data is written to the storage space;

The time at which the mirrored data is written to the storage space refers to a time at which this data is written to a local storage space of a computing device.

2) comparing the time at which the mirrored data is written to the storage space with the backup completion time point to obtain data record(s) that is/are earlier than the backup completion time point in the mirrored data; and 3) deleting the data record(s) that is/are earlier than the backup completion time point from the mirrored data.

Two types of situations exist based on the foregoing method blocks 1), 2) and 3):

The first case corresponds to a situation in which no loss exists in log data of the slave as compared with log data of the master. Since data is synchronously written to the master and the storage space, the backup completion time point is a time at which the latest piece of check information is inserted into the master. In other words, all mirrored data in the storage space is data before the backup completion time point, and data records in the mirrored data that are earlier than the backup completion time point are deleted. In other words, all the mirrored data that is stored in the storage space are deleted.

The second case corresponds to a situation in which a loss exists in log data of the slave as compared with log data of the master. In this case, data which is earlier than the backup completion time point in the mirrored data in the storage space corresponds to duplicate data between the storage space and the slave. As such, the data which is earlier than the backup completion time point in the mirrored data stored in the storage space is deleted.

In addition, deleting data record(s) that is/are earlier than the backup completion time point from mirrored data may also be implemented by other methods, which is not limited herein.

In an embodiment, a method for detecting a data difference between a master and a slave according to the present disclosure may include the following.

Figure 2:
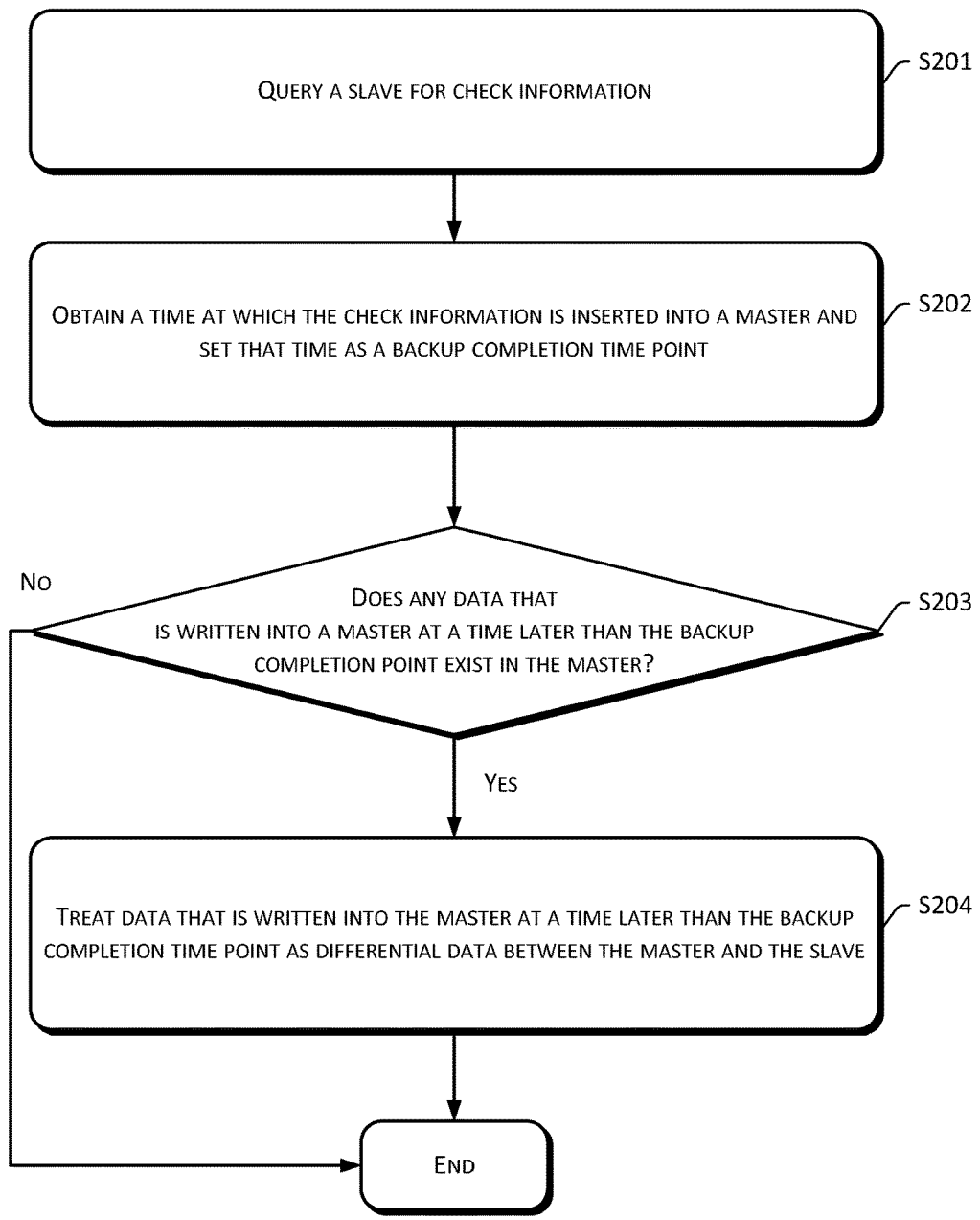
FIG. 2 is a flowchart of a method for detecting a data difference between a master and a slave according to an embodiment of the present disclosure.

FIG. 2 shows a flowchart of a method for detecting a data difference between a master and a slave according to an embodiment.

The disclosed method for detecting a data difference between a master and a slave and method blocks of the method are described herein with reference to FIG. 2. In addition, an exemplary order of the method blocks for detecting a data difference between a master and a slave is shown in FIG. 2.

S201 queries a slave for check information.

In an embodiment, the disclosed method for data backup is described using a method for backing up data based on a MySQL database as an example. Therefore, in an embodiment, a master and a slave are referred to as MySQL databases.

In addition, the disclosed method for data backup may also be described using other database platforms, which are not limited herein.

The check information refers to information inserted into the master, which contains particular information to distinguish from the data (i.e., data to be backed up).

It should be noted that, before submitting a query to a slave for check information, the method may include inserting the check information into the master, which may be implemented as follows:

Block (1) periodically detects whether any data that is written to the master at a time later than a backup completion time point exists in the master.

The data refers to data to be backed up, and includes useful data, e.g., user information, transaction information, etc., that is generated after an application program is invoked by a transaction system.

If affirmative, the method proceeds with block (2) to detect whether data that is written to the master at the time later than the backup completion time point exists in the slave.

Otherwise, this method block is repeated to return to the act of periodically detecting whether any data is written to the master at a time later than a backup completion time point exists in the master.

In addition, periodically detecting whether any data is written to the master at a time later than a backup completion time point exists in the master may also be implemented by other methods, for example, by detecting whether any data that is written to the master at a time later than the backup completion time point exists in the master in a particular period of time, which is not limited herein.

(2) detecting whether data that is written to the master at the time later than the backup completion time point exists in the slave.

If affirmative, this indicates that no differential data exists between the master and the slave.

Otherwise, the data that is written to the master at the time later than the backup completion time point is treated as the differential data between the master and the slave.

In addition, it should be noted that, before submitting a query to a slave for check information, the method may further include backing up data stored in the master and the check information to the slave in a form of a log based on a principle of asynchronous replication between the master and the slave of MySQL databases. An exemplary implementation may include recording the data written to the master and the check information into a binlog; replicating a data event recorded in the binlog to a relay log; and executing a data event recorded in the relay log, and updating the slave using data and check information recorded in the relay log.

The foregoing process of replicating the data stored in the master and the check information to the slave consumes a certain amount of time. As a result, when an abnormality occurs in the master, the data in the master and/or the check information may not be completely replicated to the slave, resulting in the slave's losses in the data and/or the check information. In view of this, the disclosed method detects a data difference between the master and the slave.

S202 obtains a time at which the check information is inserted into the master, and sets that time as a backup completion time point.

This method block is executed on a condition that the check information is found in the slave at S201.

Based on the check information found in the slave at S201, an exemplary implementation of obtaining the time at which the check information is inserted into the master and setting the time as the backup completion time point may include finding a relay log that includes the check information in a data table of the slave; reading, according to a data event recorded in the relay log, the time at which the check information is inserted into the master from the data event; and setting the time at which the check information is inserted into the master as the backup completion time point.

In addition, obtaining the time at which the check information is inserted into the master may also be implemented by other methods, for example, by reading the time at which the check information is inserted into the master from time information included in the check information and using the time as the backup completion time, which is not limited herein.

S203 detects whether any data that is written to the master at a time later than the backup completion time point exists in the master.

S201 queries to a slave for check information. S202 obtains a backup completion time point. The current method block detects whether any data that is written to the master at a time later than the backup completion time point exists in the master, i.e., detects whether differential data exists between the master and the slave.

In a situation where a time interval between cycles is short enough at S201, if data that is written to the master at a time later than the backup completion time point is found to exist in the master, this indicates that a data difference exists between the master and the slave, and the method proceeds to S204.

If no data that is written to the master at a time later than the backup completion time point is found to exist in the master, this indicates that data in the master and the slave are completely the same, and no data difference exists between the master and the slave.

S204 sets the data that is written to the master at the time later than the backup completion time point as a data difference between the master and the slave.

This method block is implemented on a condition that data that is written to the master at a time later than the backup completion time point is found to exist in the master at S203.

In a situation where a time interval between cycles is short enough at S201, if data that is written to the master at a time later than the backup completion time point is found to exist in the master, this indicates that a data difference exists between the master and the slave due to a delay caused by an asynchronous replication between the master and the salve. Such data difference exists in the master but has not been replicated to the slave, and such data difference is considered to be differential data between the master and the slave.

An embodiment of an apparatus for data backup according to the present disclosure is provided as follows.

In the foregoing embodiments, a method for data backup is provided. Correspondingly, the present disclosure provides an apparatus for data backup. Since apparatus embodiments are substantially similar to the method embodiments, a description thereof is relatively simple. Reference to related portions may be made to the method embodiments. The apparatus embodiments described herein are merely exemplary.

Figure 3:
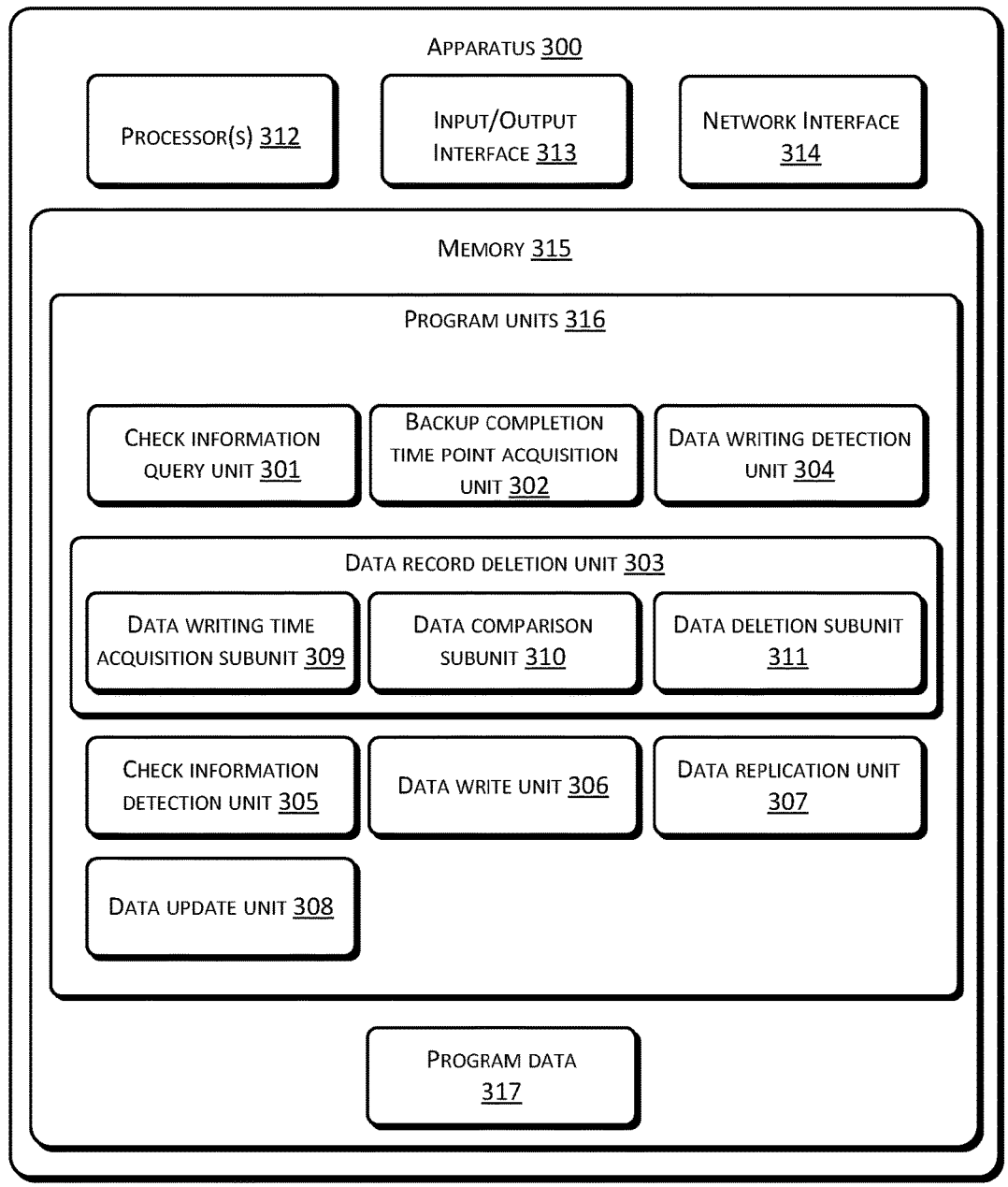
FIG. 3 is a schematic diagram of an apparatus for data backup according to an embodiment of the present disclosure.

FIG. 3 shows a schematic diagram of an apparatus 300 for data backup according to an embodiment. In implementations, the apparatus 300 may include one or more computing devices. In a typical configuration, a computing device may include one or more Central Processing Units (CPUs), I/O interfaces, network interfaces, and memory.

For example, in implementations, the apparatus 300 for data backup according to the present disclosure may include a check information query unit 301 configured to query a slave for check information, where the check information is data inserted into a master and is copied into the slave at a time when data written to the master is copied into the slave in a form of a log; a backup completion time point acquisition unit 302 configured to obtain a time at which the check information is inserted into the master and use the time as a backup completion time point; and a data record deletion unit 303 configured to delete data record(s) that is/are earlier than the backup completion time point from mirrored data, where the mirrored data is data that is synchronously written to a defined storage space when the data is written to the master.

In implementations, the following units are used to insert the check information into the master. A data writing detection unit 304 is configured to periodically detect whether any data is written to the master in a preset period of time. In response to detecting that data is written to the master in the preset period of time, a check information detection unit 305 is executed. Otherwise, operations are returned to the data writing detection unit 304. The check information detection unit 305 is configured to detect whether the check information exists in the master, insert the check information into the master to replace original check information stored in the master if affirmative, or insert the check information into the master if not.

In implementations, the data and the check information are backed up into the slave through the following units. A data write unit 306 is configured to record the data written to the master and the check information into a binary log. A data replication unit 307 is configured to replicate a data event recorded in the binary log to a relay log. A data update unit 308 is configured to execute a data event recorded in the relay log, and update the slave using data and check information recorded in the relay log.

In implementations, the data record deletion unit 303 may include a data writing time acquisition subunit 309 configured to obtain a time at which the mirrored data is written into the storage space; a data comparison subunit 310 configured to compare the time at which the mirrored data is written into the storage space with the time point of backup complete to obtain data record(s) in the mirrored data that is/are earlier than the time point of backup complete; and a data deletion subunit 311 configured to delete the data record(s) that is/are earlier than the time point of backup complete from the mirrored data.

In implementations, the apparatus 300 may further include, but is not limited to, one or more processors 312, an input/output interface 313, a network interface 314, and memory 315.

The memory 315 may include a form of computer-readable media, e.g., a non-permanent storage device, random-access memory (RAM) and/or a nonvolatile internal storage, such as read-only memory (ROM) or flash RAM. The memory 315 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

The memory 315 may include program units 316 and program data 317. The program units 316 may include one or more of the units and subunits of the apparatus 300 as described in the foregoing description.

An embodiment of an apparatus for detecting a data difference between a master and a slave according to the present disclosure is provided as follows.

In the foregoing embodiments, a method for detecting a data difference between a master and a slave is provided. Correspondingly, the present disclosure provides an apparatus for detecting a data difference between a master and a slave. Since apparatus embodiments are substantially similar to the method embodiments, a description thereof is relatively simple. Reference to related portions may be made to the method embodiments. The apparatus embodiments described herein are merely exemplary.

Figure 4:
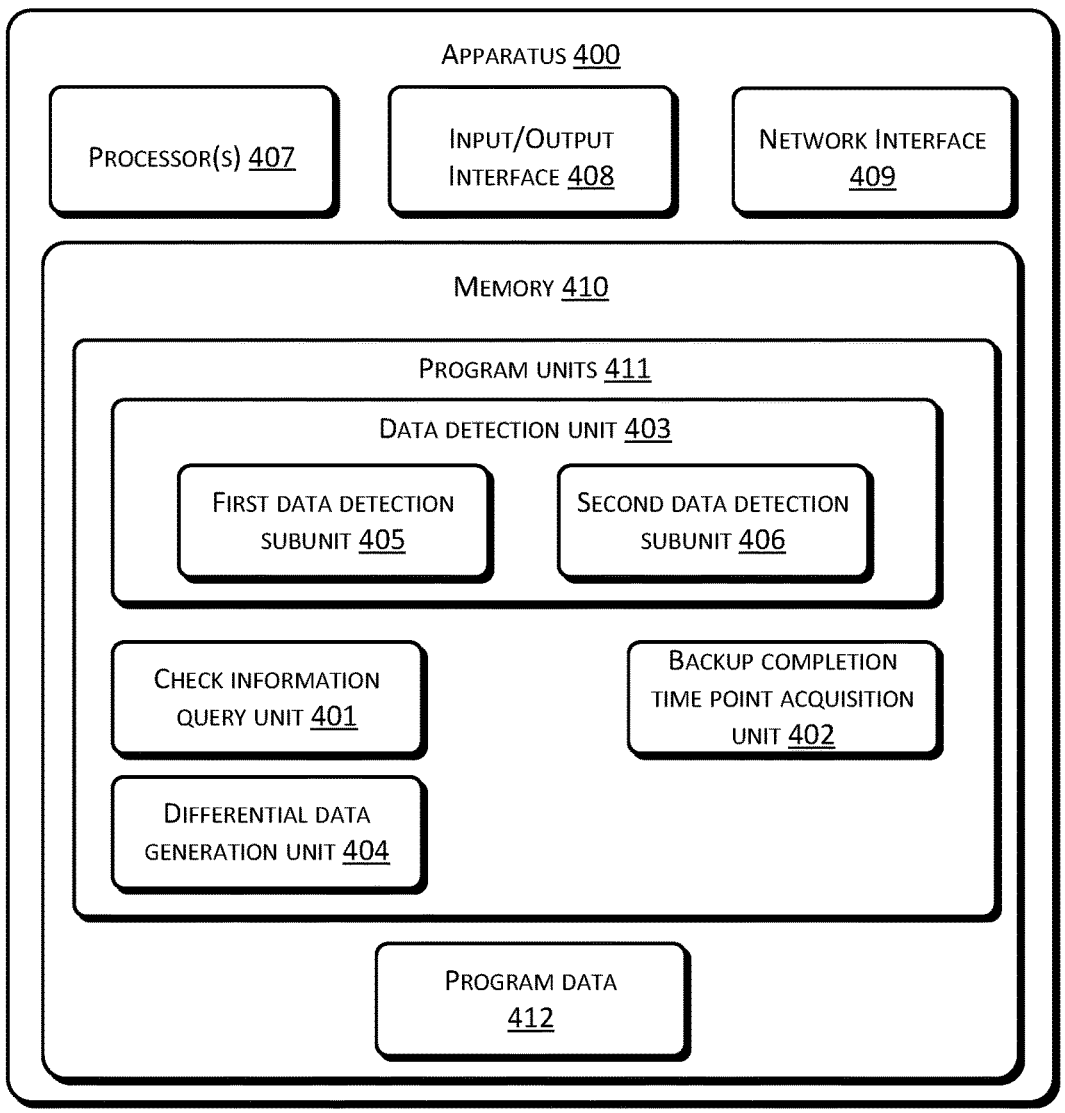
FIG. 4 is a schematic diagram of an apparatus for detecting a data difference between a master and a slave according to an embodiment of the present disclosure.

FIG. 4 shows a schematic diagram of an apparatus 400 for detecting a data difference between a master and a slave according to an embodiment. In implementations, the apparatus 400 may include one or more computing devices. In a typical configuration, a computing device may include one or more Central Processing Units (CPUs), I/O interfaces, network interfaces, and memory.

For example, in implementations, the apparatus 400 for detecting a data difference between a master and a slave may include a check information query unit 401 configured to query a slave for check information, wherein the check information is information inserted into a master, and the check information is backed up into the slave at a time when data written in the master is backed up to the slave in a form of a log; a backup completion time point acquisition unit 402 configured to obtain a time at which the check information is inserted into the master, and use the time as a backup completion time point; and a data detection unit 403 configured to detect whether data that is written into the master at a time later than the backup completion time point exists in the master, wherein a differential data generation unit 404 is executed if affirmative, the differential data generation unit 404 being configured to use the data that is written into the master at the time later than the backup completion time point as differential data between the master and the slave.

In implementations, the data detection unit 403 may include a first data detection subunit 405 configured to periodically detect whether data that is written to the master at a time later than the backup completion time point exists in the master, wherein a second data detection subunit 406 is executed if affirmative, the second data detection subunit 406 being configured to detect whether the data that is written to the master at the time later than the backup completion time point exists in the slave, determine that no differential data exists between the master and the slave in response to detecting that the data that is written to the master at the time later than the backup completion time point exists in the slave, and use the data that is written to the master at the time later than the backup completion time point as the differential data between the master and the slave in response to detecting that the data that is written to the master at the time later than the backup completion time point does not exist in the slave.

In implementations, the apparatus 400 may further include, but is not limited to, one or more processors 407, an input/output interface 408, a network interface 409, and memory 410. The memory 410 may include a form of computer-readable media, e.g., a non-permanent storage device, random-access memory (RAM) and/or a nonvolatile internal storage, such as read-only memory (ROM) or flash RAM. The memory 410 is an example of computer-readable media as described in the foregoing description.

The memory 410 may include program units 411 and program data 412. The program units 411 may include one or more units and subunits of the apparatus 400 as described in the foregoing embodiments.

Although the present disclosure has been described above using exemplary embodiments, these embodiments are not intended to limit the present disclosure. One skilled in the art may make various variations and modifications without departing from the spirit and scope of the present disclosure.

Therefore, the scope of protection of the present disclosure shall be subject to the scope defined by the appended claims of the present disclosure.

Furthermore, one skilled in the art should understand that the embodiments of the present disclosure may be provided as a method, a system or a computer program product. Therefore, the present disclosure may be implemented as a completely hardware embodiment, a completely software embodiment, or an embodiment of a combination of software and hardware. Moreover, the present disclosure may be a computer program product implemented on one or more computer usable storage media (including, but not limited to, a magnetic disk memory, a CD-ROM, an optical memory, and the like) including computer usable program codes.

What is claimed is:

1. A method implemented by one or more computing devices, the method comprising:
    querying a slave for check information, the check information comprising information that is inserted into a master and is copied into the slave when first data written to the master is copied into the slave in a form of a log;
    obtaining a time at which the check information is inserted into the master and using the time as a backup completion time point; and
    deleting one or more data records that are earlier than the backup completion time point from mirrored data, the mirrored data being second data that is synchronously written to a storage space when the second data is written to the master.

2. The method of claim 1, further comprising inserting the check information into the master, the inserting comprising:
    periodically detecting whether any piece of data is written to the master in a preset period of time;
    in response to detecting that a piece of data is written to the master in the preset period of time, detecting whether the check information exists in the master; and
    in response to detecting that the check information exists in the master, inserting the check information into the master by replacing stored check information in the master.

3. The method of claim 1, further comprising:
    recording the first data written to the master and the check information into a binary log;
    replicating at least one data event recorded in the binary log to a relay log; and
    executing one or more data events recorded in the relay log, and updating the slave using respective data and check information recorded in the relay log.

4. The method of claim 3, wherein obtaining the time at which the check information is inserted into the master comprises reading the time at which the check information is inserted into the master from a data event recorded in the relay log.

5. The method of claim 1, wherein deleting the one or more data records comprises:
    obtaining a time at which the mirrored data is written to the storage space;
    comparing the time at which the mirrored data is written to the storage space with the backup completion time point to obtain the one or more data records in the mirrored data that are earlier than the backup completion time point; and
    deleting the one or more data records that are earlier than the backup completion time point from the mirrored data.

6. The method of claim 1, wherein obtaining the time at which the check information is inserted into the master comprises reading the time at which the check information is inserted into the master from the check information.

7. The method of claim 1, further comprising synchronously writing the second data to the storage space when the second data is written to the master, the synchronously writing comprising one or more of:
    synchronously writing the second data to the storage space via a local storage; or
    synchronously writing the second data to the storage space via a remote storage.

8. The method of claim 7, wherein the storage space comprises internal memory and/or a magnetic disk.

9. One or more computer-readable media storing executable instructions that, when executed by one or more processors, cause the one or more processors to perform acts comprising:
    querying a slave for check information, the check information comprising information is inserted into a master and is copied into the slave when data written to the master is copied into the slave in a form of a log;
    obtaining a time at which the check information is inserted into the master and using the time as a backup completion time point; and
    detecting whether any data is written to the master later than the backup completion time point.

10. The one or more computer-readable media of claim 9, the acts further comprising treating a piece of data as differential data between the master and the slave in response to determining that the piece of data is written to the master later than the backup completion time point.

11. The one or more computer-readable media of claim 9, the acts further comprising indicating that no differential data exists between the master and the slave in response to determining that no data is written to the master later than the backup completion time point.

12. The one or more computer-readable media of claim 9, wherein detecting whether any data is written to the master later than the backup completion time point is performed on a periodic basis.

13. The one or more computer-readable media of claim 9, the acts further comprising deleting one or more data records that are earlier than the backup completion time point from mirrored data, the mirrored data being the data that is synchronously written to a storage space when the data is written to the master.

14. The one or more computer-readable media of claim 9, wherein obtaining the time at which the check information is inserted into the master comprises reading the time at which the check information is inserted into the master from the check information.

15. The one or more computer-readable media of claim 9, the acts further comprising:
    recording the data written to the master and the check information into a binary log;
    replicating at least one data event recorded in the binary log to a relay log; and
    executing one or more data events recorded in the relay log, and updating the slave using respective data and check information recorded in the relay log.

16. The one or more computer-readable media of claim 15, wherein obtaining the time at which the check information is inserted into the master comprises reading the time at which the check information is inserted into the master from a data event recorded in the relay log.

17. An apparatus comprising:
one or more processors;
memory;
a check information query unit stored in the memory and executable by the one or more processors to query a slave for check information, the check information comprising information that is inserted into a master and is copied into the slave when first data written to the master is copied into the slave in a form of a log;
a backup completion time point acquisition unit stored in the memory and executable by the one or more processors to obtain a time at which the check information is inserted into the master, and set the time as a backup completion time point; and
a data record deletion unit stored in the memory and executable by the one or more processors to delete one or more data records in mirrored data that are earlier than the backup completion time point, the mirrored data being second data that is synchronously written to a storage space when the second data is written to the master.

18. The apparatus of claim 17, further comprising:
a data writing detection unit configured to periodically detect whether any piece of data is written to the master in a preset period of time; and
a check information detection unit configured to detect whether the check information exists in the master after the data writing detection unit detects that a piece of data is written to the master in the preset period of time, and upon detecting that the check information exists in the master, insert the check information into the master by replacing stored check information in the master.

19. The apparatus of claim 17, further comprising:
a data write unit configured to record the first data written to the master and the check information into a binary log;
a data replication unit configured to replicate at least one data event recorded in the binary log to a relay log; and
a data update unit configured to execute one or more data events recorded in the relay log, and update the slave using respective data and check information recorded in the relay log.

20. The apparatus of claim 17, wherein the data record deletion unit comprises:
a data writing time acquisition subunit configured to obtain a time at which the mirrored data is written to the storage space;
a data comparison subunit configured to compare the time at which the mirrored data is written to the storage space with the backup completion time point to obtain the one or more data records that are earlier than the backup completion time point in the mirrored data; and
a data deletion subunit configured to delete the one or more data records that are earlier than the backup completion time point from the mirrored data.

* * * * *